United States Patent
Miura et al.

(10) Patent No.: US 6,780,944 B1
(45) Date of Patent: Aug. 24, 2004

(54) RESIN COMPOSITION

(75) Inventors: Yasuki Miura, Kanagawa (JP); Fukuo Kanno, Kanagawa (JP); Masataka Yokota, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/623,486
(22) PCT Filed: Mar. 17, 1999
(86) PCT No.: PCT/JP99/01323
§ 371 (c)(1),
(2), (4) Date: Sep. 15, 2000
(87) PCT Pub. No.: WO99/47607
PCT Pub. Date: Sep. 23, 1999

(30) Foreign Application Priority Data
Mar. 19, 1998 (JP) .......................... 10-070848

(51) Int. Cl.[7] ............................................. C08F 283/00
(52) U.S. Cl. ....................... 525/537; 525/390; 525/391; 524/81; 524/401; 528/373; 528/397; 528/401
(58) Field of Search ................................ 525/390, 391, 525/537; 524/81, 401; 528/373, 397, 401

(56) References Cited

U.S. PATENT DOCUMENTS

| 5,618,873 A | 4/1997 | Tanaka et al. ............... 524/430 |
| 5,906,967 A | * 5/1999 | Kato et al. .................. 508/106 |

FOREIGN PATENT DOCUMENTS

| EP | 0 112 196 | 6/1984 |
| EP | 0 199 991 | 11/1986 |
| EP | 0 460 689 | 12/1991 |
| JP | 3-292366 | 12/1991 |
| JP | 9-132691 | 5/1997 |
| JP | 9-286916 | 11/1997 |

* cited by examiner

Primary Examiner—Samuel A. Acquah
(74) Attorney, Agent, or Firm—Oblon, Spivak, McClelland, Maier & Neustadt, P.C.

(57) ABSTRACT

A resin composition which comprises from 50 to 99.5 parts by weight of a polyphenylene sulfide and from 0.5 to 50 parts by weight of a fluorinated resin having a solidification temperature of at least 237° C. when cooled at a cooling rate of 10° C./min after melting in a nitrogen atmosphere at 330° C., and from 0 to 250 parts by weight of a filler, etc. per 100 parts by weight of the two components.

4 Claims, 1 Drawing Sheet

RESIN COMPOSITION

TECHNICAL FIELD

The present invention relates to a resin composition comprising a polyphenylene sulfide (hereinafter referred to as PPS) and a fluorinated resin, particularly to a resin composition whereby the dimensional accuracy of a three-dimensional molded product obtainable by an injection molding method is remarkably improved.

BACKGROUND ART

PPS is known as a resin excellent in heat resistance, solvent resistance, electrical properties, mechanical strength, dimensional stability, flame retardancy, etc. and its applications include a material for parts of electrical and electronic appliances, a material for parts of automobiles, a material for parts of chemical equipments and material for other functional parts.

In majority of such applications, parts formed by an injection molding method are employed. However, the required properties are finely divided. For example, among parts which used to be processed by metal cutting processing etc., there are ones which are required to have particularly high dimensional accuracy, and it has been difficult to substitute PPS for them.

The reason has been such that PPS has a low polymerization degree and is usually combined with e.g. an inorganic filler or a fiber-reinforcing agent such as glass fibers or carbon fibers to have properties useful as an engineering plastic, but when it is injection-molded, a phenomenon is likely to occur wherein depending upon the direction of alignment of the fiber reinforcing material, the dimension of the molded product differs, whereby a predetermined dimensional accuracy tends to be hardly obtainable.

Further, when an inorganic filler which brings about no problem of the alignment direction, such as glass beads, zinc oxide or calcium carbonate, is incorporated to PPS, the problem of alignment of the filler at the time of injection molding, will be solved, but fluctuations among molding shots tend to be large, and the required dimensional accuracy can not be satisfied.

For example, in order to obtain high dimensional accuracy of a three-dimensional molded product, there is a proposal such that a composition comprising PPS and a certain specific silane-treated silica powder, is molded into a connector ferrule for optical fiber (JP-A-6-299072), or a composition having from 0.5 to 5 wt % of PPS blended to a tetrafluoroethylene (hereinafter referred to as TFE)/perfluoro(alkylvinyl ether) (hereinafter referred to as PAVE) copolymer (hereinafter referred to as PFA), is used for lining by a rotational molding method (JP-A-5-112690). However, such compositions are different in the compositional ratio from the composition of the present invention.

There are also a proposal to obtain a molded product having the dimensional stability in oil and abrasion resistance improved by insert molding a cylinder piston from a composition comprising specific amounts of PPS, a fluorinated resin, a spherical filler and a fibrous filler (JP-A-3-74681), a proposal to obtain a molded product made of a composition comprising PPS, a polyvinylidene fluoride (hereinafter referred to as PVDF) and a homopolymer or copolymer of TFE (JP-A-5-29520), and a proposal to improve the mutual dispersibility of PPS and a fluorinated resin in a composition comprising PPS, a fluorinated resin having a melting point of at most 320° C. and an aminoalkoxy silane and thereby to improve the mechanical strength of its molded product (JP-A-8-53592). However, there is no disclosure as to whether or not a molded product having high dimensional accuracy can thereby be obtained.

DISCLOSURE OF THE INVENTION

An object of the present invention is to provide a resin composition comprising PPS, a fluorinated resin and further a filler, whereby a three-dimensional molded product having high dimensional accuracy, can be obtained by injection molding.

The present inventors have conducted a study diligently and as a result, they have found it possible to accomplish the above object by incorporating to PPS a specific amount of a fluorinated resin having a solidification temperature higher than PPS and thus have arrived at the present invention.

Namely, the present invention provides a resin composition which comprises the following (a) and the following (b) in a proportion of from 50 to 99.5 wt % of (a) and from 0.5 to 50 wt % of (b) in the total amount of (a) and (b). Further, it provides the above resin composition which further contains the following (c) in a ratio of more than 0 part by weight and not more than 250 parts by weight in the total amount per 100 parts by weight of the total amount of (a) and (b).

(a) a polyphenylene sulfide;

(b) a fluorinated resin having a solidification temperature $(T_{mc})$ of at least 237° C. when cooled at a cooling rate of 10° C./min after melting in a nitrogen atmosphere at 330° C.; and (c) at least one member selected from the group consisting of an organic reinforcing material, an inorganic reinforcing material and a filler.

BEST MODE FOR CARRYING OUT THE INVENTION

PPS (a) to be used in the present invention, is a polymer comprising repeating units of a structure which is substantially represented by the formula 1 and is a random copolymer or a block copolymer containing at least 70 mol %, preferably at least 90 mol %, of such repeating units. If the repeating units are less than 70 mol %, it tends to be difficult to obtain a composition which satisfies the purpose of the present invention.

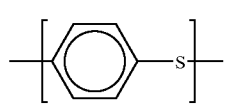

Formula (1)

Copolymer units other than the repeating units of the structure represented by the formula 1, may be present in a ratio of less than 30 mol %, preferably less than 10 mol %, in PPS (a) and may contain units of arylene sulfide structures represented by the following structures, within a range not to lower the crystallinity of the polymer.

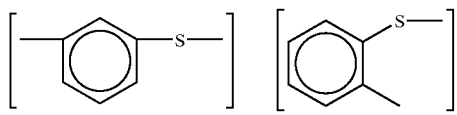

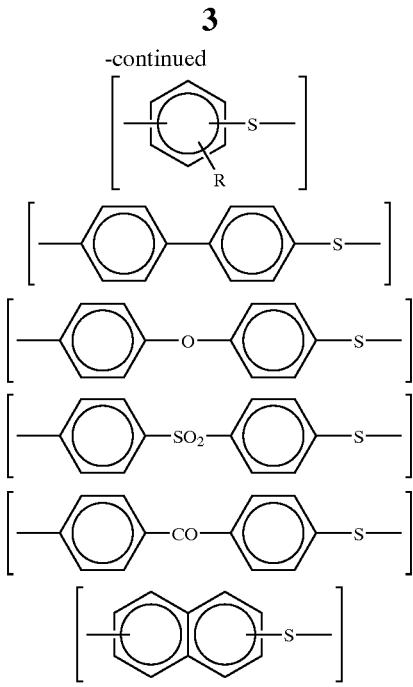

(R represents an alkyl group, a nitro group, a phenyl group, an alkoxy group, a carboxyl group or a metal carboxylate group.)

PPS (a) can be obtained by various known polymerization methods. A method of reacting sodium sulfide with p-dichlorobenzene in an amide type solvent such as N-methylpyrrolidone or dimethylacetamide or in a sulfone type solvent such as sulfolane, is suitable. In such a case, it is preferred to add an alkali metal carboxylate such as sodium acetate or lithium acetate to control the degree of polymerization.

PPS (a) can be used, washed after completion of the polymerization. Further, one which is treated with an aqueous solution containing an acid such as hydrochloric acid or acetic acid or with a water/organic solvent mixed solution, or one which is treated with a solution of a salt such as ammonium chloride, may also be used. The melt index of PPS (a) is preferably from 0.1 to 500, particularly preferably from 1 to 300, as measured under conditions of a cylinder temperature of 300° C., a load of 5 kg, an orifice diameter of 2.095 mm and a length of 8 mm. If the melt index is less than 0.1, the fluidity at the time of injection molding tends to be poor, and if it exceeds 500, the mechanical strength of the molded product tends to be low, such being unsuitable for industrial parts.

The fluorinated resin (b) is a fluorinated resin having a solidification temperature ($T_{mc}$) of at least 237° C. when cooled at a cooling rate of 10° C./min after melting in a nitrogen atmosphere at 330° C.

Specifically, PFA or TFE/hexafluoropropylene (hereinafter referred to as HFP) copolymer (hereinafter referred to as FEP) may be mentioned.

PFA is preferably one wherein the carbon number of the alkyl group of PAVE as its polymer component is from 1 to 6, and polymer units based on PAVE are from 1 to 5 mol %, which is commercially available. As PAVE, perfluoro (propylvinyl ether), perfluoro(ethylvinyl ether) or perfluoro (methylvinyl ether) is preferred, and particularly preferred is perfluoro(propylvinyl ether). PFA may contain polymer units based on two or more of them.

FEP is preferably one wherein polymer units based on HFP are from 1 to 20 mol %, which is commercially available.

Further, as a fluorinated resin (b) other than PFA or FEP, a PAVE/HFP/TFE copolymer, and a polymer component other than PAVE or HFP/(PAVE and/or HFP)/TFE copolymer may, for example, be employed. Preferred is one wherein, in such a copolymer, polymer units based on PAVE are from 0 to 5 mol %, polymer units based on HFP are from 0 to 20 mol %, and the total of polymer units based on PAVE and HFP is from 1 to 20 mol %. Specifically, a copolymer may be employed which contains, for example, 0.5 mol % of polymer units based on perfluoro(propylvinyl ether) and 7.0 mol % of polymer units based on HFP.

The melt index of such a fluorinated resin (b) is not particularly limited but is preferably at least 0.1 as measured under conditions of 330° C., a load of 5 kg, an orifice diameter of 2.095 mm and a length of 8 mm, as the resin is thereby readily dispersible. The measuring conditions for the melt index are stipulated by ASTM D1238.

Further, such a fluorinated resin (b) can be produced by various conventional polymerization methods such as suspension polymerization, emulsion polymerization and solution polymerization.

The blend ratio (a)/(b) of PPS (a) to the fluorinated resin (b) for the composition of the present invention is from 50/50 to 99.5/0.5 by weight ratio. Particularly preferred is from 70/30 to 95/5 (weight ratio). If the weight ratio of PPS is less than 50/50, the fluorinated resin tends to hardly form an island structure clearly, and if it exceeds 99.5/0.5, the amount of the fluorinated resin tends to be small, whereby the effect of the present invention can not be expected. In the matrix of the composition, it is preferred that the sea portion is formed by PPS, and the island portion is formed by the fluorinated resin.

BRIEF DESCRIPTION OF DRAWINGS

The effect that a molded product obtainable from the composition of the present invention has high dimensional accuracy, is likely to be obtainable when the fluorinated resin solidifies before the solidification of PPS (a). With respect to the mechanism of generation of this effect, (1) by the incorporation of the fluorinated resin (b) to PPS (a), the pressure loss of the injection pressure decreases during the passage of the molten composition through the gate of the mold. The reason for this is believed to be such that the fluorinated resin functions as an internal lubricant. As a result, the injection pressure is effectively transmitted to the composition in the mold. The cross section of the mold is shown schematically in FIG. 1. Reference numeral 1 represents a sprue, 2 a runner, 3 a pin gate and 4 a molded product.

(2) The fluorinated resin (b) solidifies before gate sealing i.e. in a state where the maintained pressure is effectively acting on the composition in the mold, and PPS (a) solidifies after the gate sealing. Via this solidification process of two steps, the volume shrinkage after gate sealing is reduced. It is considered that by the above functions, fluctuations among molding shots and the mold transferability are suppressed, whereby the effects of the present invention are generated.

Specifically, a molded product obtainable by injection molding at a cylinder temperature of 330° C. and a mold temperature of 150° C. as shown in the Examples of the composition of the present invention, has excellent dimensional accuracy such that the size difference between position A and position B of the molded product shown in FIG. 2, and the difference between the maximum size and the minimum size at position B by 100 shot molding, are about 1/10 of the differences in conventional composition. In FIG. 2, the unit of the size is mm, and D1 represents a diameter of 25.0, D2 a diameter of 19.0; D3 a diameter of 35.0, D4 a diameter of 24.6, D5 a diameter of 22.8, D6 a diameter of 19.6, L1 35.0, L2 20.0, L3 5.4, L4 3.0, L5 8.0 and L6 2.0.

Figure 1:
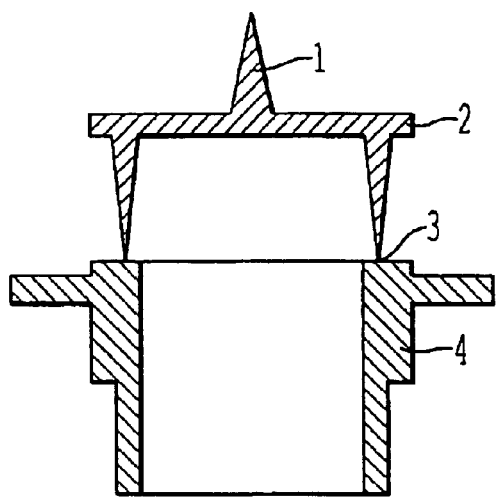

Further, the composition of the present invention contains (c) an organic reinforcing material, an inorganic reinforcing material or a filler in addition to (a) and (b), and it may contain at most 250 parts by weight of (c) an organic reinforcing material, an inorganic reinforcing material or a filler, per 100 parts by weight of the total of (a) and (b). If component (a) exceeds 250 parts by weight, injection molding tends to be difficult. Further, injection molding can be carried out even if component (c) is not incorporated.

Specific examples of component (c) include an organic filler such as thermosetting resin powder, an inorganic filler such as ferrite, mica, silica, talc, alumina, kaolin, calcium sulfate, calcium carbonate, graphite, titanium oxide, zinc oxide or carbon black, an inorganic reinforcing material such as glass fiber, carbon fiber or whisker of e.g. potassium titanate or aluminum borate, and an organic reinforcing material such as polyimide fiber. Such a component (c) may be employed as it is, but it is preferred to employ one having the surface treated with e.g. a silane coupling agent prior to the compounding.

Further, a lubricant, a stabilizer, a pigment, etc. may be added as the case requires.

For the preparation of the resin composition of the present invention, a method of charging into a hopper of an extruder by means of many measuring feeders or a method of preliminary mixing by means of a tumbler, a V mixer or a Henschel mixer, followed by melt kneading for palletizing by means of the same directional or different directional twin screw extruder kneader selecting screws having a kneading function, is employed.

Now, the present invention will be described in further detail with reference to Examples (Examples 1, 2, 8 and 9) and Comparative Examples (Examples 3 to 7 and 10 to 13), but the present invention is not thereby limited.
Measurement of the Solidification Temperature Measured by means of a thermal analysis system SSC5200 (manufactured by Seiko Denshi Kogyo K.K.) by heating a sample in a nitrogen atmosphere from normal temperature to 330° C. at 10° C./min, maintaining it at 330° C. for 5 minutes and then cooled it from 330° C. to 100° C. at 10° C./min.
Raw Materials Used PPS: M-2100 (solidification temperature: 237° C.), manufactured by Toray Corporation.

PTFE: Fluone PTFE L-150J (no solidification temperature), manufactured by Asahi Glass Company, Limited.

PFA: Aflone PFA P-61 (solidification temperature: 271° C.), manufactured by Asahi Glass Company, Limited.

FEP: Aflone FEP (solidification temperature: 241° C.), manufactured by Asahi Glass Company, Limited.

ETFE: Aflone COP C88AX (solidification temperature: 230° C.), manufactured by Asahi Glass Company, Limited.

Low melting point ETFE (hereinafter referred to as LM-ETFE): Aflone LM740 (solidification temperature: 206° C.), manufactured by Asahi Glass Company, Limited.

PVdF: Neoflone VPBOO (solidification temperature: 150° C.), manufactured by Daikin K.K.

Glass fiber: 03MAFT562, manufactured by Asahi Fiber Glass Company, Limited.

Spherical silica: FB-35, manufactured by Denki Kagaku Kogyo K.K.

Calcium carbonate: NS200, manufactured by Nitto Funka Kogyo K.K.

The glass fiber, the spherical silica and the calcium carbonate were not surface treated with e.g. a silane coupling agent before compounding.

EXAMPLES 1 TO 6

Introducing PPS and a filler into a hopper of a first feeder and a fluorinated resin into a hopper of a second feeder, of a same directional twin screw extrusion kneader having screws having two kneading portions set, in a weight ratio as shown in Table 1, the raw materials were kneaded at a cylinder temperature of 320° C. at a screw rotational speed of 100 rpm while vacuuming from a vent by a vacuum pump, and a discharged strand was annealed and then cut into a length of 3 mm by pelletizer to obtain a composition.

The cylinder temperature of an electrically operated type molding machine with a mold clamping of 30 tons, was set at 330° C. The prepared composition was injected through a pin point gate with three points, as shown in FIG. 1 and injection-molded by a mold engraved with a flanged cylindrical sleeve-shape and heated to 150° C. by a heating medium, under a condition of 800 kg/cm$^2$ at an injection rate of 80 mm/sec., to obtain a molded product.

Figure 2:
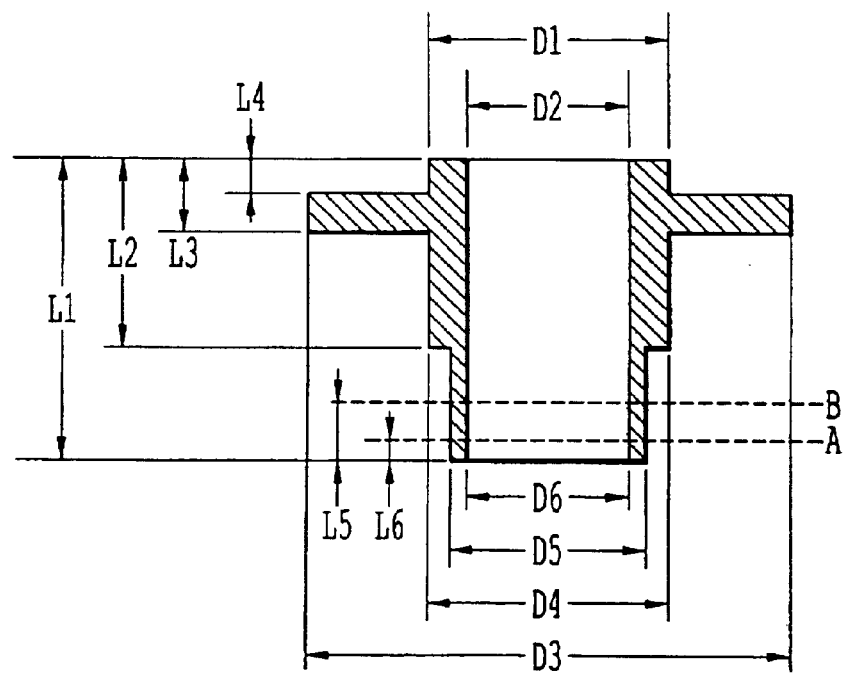
FIG. 2 is a cross-sectional view of the molded product and shows the dimensional shape.

With respect to the obtained molded product, the outer diameters at positions A and B in FIG. 2 were measured by a laser scanning micrometer (manufactured by Mitsutoyo K.K.). The size difference ($\mu$m) between position A and position B (hereinafter referred to as the A/B size difference), and the difference ($\mu$m) between the maximum size and the minimum size of 100 shots molded products at position B (hereinafter referred to as the B size difference) are shown in Table 1.

TABLE 1

| Composition | Ex. 1 | Ex. 2 | Ex. 3 | Ex. 4 | Ex. 5 | Ex. 6 | Ex. 7 |
|---|---|---|---|---|---|---|---|
| PPS | 90 | 90 | 90 | 90 | 90 | 90 | 100 |
| Fluorinated resin: | | | | | | | |
| PTFE | | | | 10 | | | |
| PFA | 10 | | | | | | |
| FEP | | 10 | | | | | |
| ETFE | | | | | 10 | | |
| LM-ETFE | | | | | | 10 | |
| PVdF | | | | | | | 10 |
| Filler: | | | | | | | |
| Spherical silica | 100 | 100 | 100 | 100 | 100 | 100 | 100 |
| A/B size difference | 4 | 6 | 42 | 23 | 30 | 50 | 21 |
| B size difference | 6 | 7 | 58 | 25 | 23 | 43 | 55 |

EXAMPLES 7 TO 12

Examples 8 and 9 Are Comparative Examples

Introducing PPS and a filler into a hopper of the first feeder and a fluorinated resin into a hopper of the second feeder, of the kneader used in Examples 1 to 6, in the weight ratio as identified in Table 2, and further introducing glass fiber into the extruder by a side feeding method, kneading was carried out in the same manner as in Examples 1 to 6 to obtain a composition, which was then molded to obtain a molded product. The results of the outer diameters measured with respect to the molded product, are shown in Table 2.

TABLE 2

| Composition | Ex. 8 | Ex. 9 | Ex. 10 | Ex. 11 | Ex. 12 | Ex. 13 |
|---|---|---|---|---|---|---|
| PPS | 90 | 90 | 90 | 90 | 90 | 90 |
| Fluorinated resin: | | | | | | |
| PTFE | | | 10 | | | |
| PFA | 10 | | | | | |
| FEP | | 10 | | | | |
| ETFE | | | | 10 | | |
| LM-ETFE | | | | | 10 | |
| PVdF | | | | | | 10 |
| Filler: | | | | | | |
| Calcium carbonate | 40 | 40 | 40 | 40 | 40 | 40 |
| Glass fiber | 60 | 60 | 60 | 60 | 60 | 60 |
| A/B size difference | 8 | 10 | 82 | 43 | 50 | 70 |
| B size difference | 9 | 8 | 68 | 25 | 19 | 33 |

INDUSTRIAL APPLICABILITY

With the resin composition of the present invention, the dimensional accuracy of a molded product having a three-dimensional shape, obtainable by injection molding thereof, is very high, and accordingly, it is useful for application to various parts or structural materials, for automobile or household electrical appliances and electronic fields.

What is claimed is:

1. A resin composition, comprising:
   (a) from 50 to 99.5 wt % of a polyphenylene sulfide, based on a total amount of (a) and ($b^1$),
   ($b^1$) from 0.5 to 50 wt % of a tetrafluoroethylene/perfluoro(alkylvinyl ether) copolymer or a tetrafluoroethylene/hexafluoropropylene copolymer, based on a total amount of (a) and ($b^1$); and
   (c) more than 0 to not more than 250 parts by weight of at least one member selected from the group consisting of an inorganic filler selected from the group consisting of ferrite, mica, silica, talc, alumina, kaolin, calcium sulfate, calcium carbonate, graphite, titanium oxide, zinc oxide, and carbon black, based on 100 parts by weight of the total amount of (a) and ($b^1$).

2. The resin composition according to claim 1, comprising from 70 to 95 wt % of component (a) and from 5 to 30 wt % of component ($b^1$), based on the total amount of (a) and ($b^1$).

3. The resin composition according to claim 1, wherein the component (c) is spherical silica.

4. The resin composition according to claim 1, comprising from 10 to 250 parts by weight of component (c) based on 100 parts by weight of the total amount of (a) and ($b^1$).

* * * * *